(12) United States Patent
Khan

(10) Patent No.: US 12,542,770 B2
(45) Date of Patent: Feb. 3, 2026

(54) SYSTEMS AND METHODS FOR DYNAMIC MESSAGE VERIFICATION

(71) Applicant: Verizon Patent and Licensing Inc., Basking Ridge, NJ (US)

(72) Inventor: Tahir H. Khan, Aldie, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 268 days.

(21) Appl. No.: 18/155,822

(22) Filed: Jan. 18, 2023

(65) Prior Publication Data
US 2024/0244042 A1    Jul. 18, 2024

(51) Int. Cl.
*H04L 9/40* (2022.01)
*H04L 51/063* (2022.01)

(52) U.S. Cl.
CPC ............ *H04L 63/08* (2013.01); *H04L 51/063* (2013.01)

(58) Field of Classification Search
None
See application file for complete search history.

(56) References Cited

U.S. PATENT DOCUMENTS

| | | | |
|---|---|---|---|
| 8,429,232 B1* | 4/2013 | Appenzeller | H04L 51/063 709/206 |
| 2010/0095352 A1* | 4/2010 | Adams | H04L 43/00 709/206 |
| 2013/0166914 A1* | 6/2013 | Vandervort | H04L 63/123 713/176 |
| 2018/0091453 A1* | 3/2018 | Jakobsson | H04L 63/1441 |
| 2021/0385183 A1* | 12/2021 | Henao Mota | H04L 63/0838 |
| 2024/0089285 A1* | 3/2024 | Jakobsson | H04L 51/212 |

\* cited by examiner

*Primary Examiner* — Philip J Chea
*Assistant Examiner* — James Ross Hollister

(57) ABSTRACT

A system described herein may receive a message that includes a set of authentication credentials and first message content. The system may determine whether the authentication credentials are valid. When determining that the authentication credentials are not valid, the system may generate second message content by modifying the first message content, and output the message with the modified message content in lieu of the first message content. When determining that the authentication credentials are valid, the system may output the message with the first message content without modifying the first message content. Verifying the credentials may be performed based on attributes of a sender of the message, such as based on determining that a domain of the sender does not match a domain of a recipient of the message.

20 Claims, 12 Drawing Sheets

SYSTEMS AND METHODS FOR DYNAMIC MESSAGE VERIFICATION

BACKGROUND

Entities such as organizations, institutions, etc. may utilize electronic messaging systems to provide for communications between members of such entities and/or between multiple different entities. In general, members of an organization or other entity may trust each other. As such, messages exchanged between members of the same organization or entity may be regarded as "trusted," while messages from external sources (e.g., from outside the organization) may be "untrusted." Some organizations may quarantine, block, modify, etc. messages from untrusted sources.

DETAILED DESCRIPTION OF EXAMPLE EMBODIMENTS

The following detailed description refers to the accompanying drawings. The same reference numbers in different drawings may identify the same or similar elements.

Embodiments described herein provide for the dynamic authentication and/or authorization of sources of messages, and the appropriate handling of messages based on the authentication and/or authorization techniques described herein. For example, a given entity may modify messages sent from external sources (e.g., messages originating from a different entity), but may forgo modifying messages sent from internal sources (e.g., messages originating from the same entity). In accordance with some embodiments described herein, messages from an external source may be treated the same as messages from an internal source, such as by presenting, forwarding, etc. messages without modifying such messages, even if sent by an external source. In this manner, messages received from external sources may be accessed by users of a given entity, organization, etc. as if such messages were received from an internal source, thereby enhancing the user experience of senders and/or recipients of such messages and allowing for expanded communications between different entities while allowing for such entities to maintain control over their own respective security policies.

Figure 1:
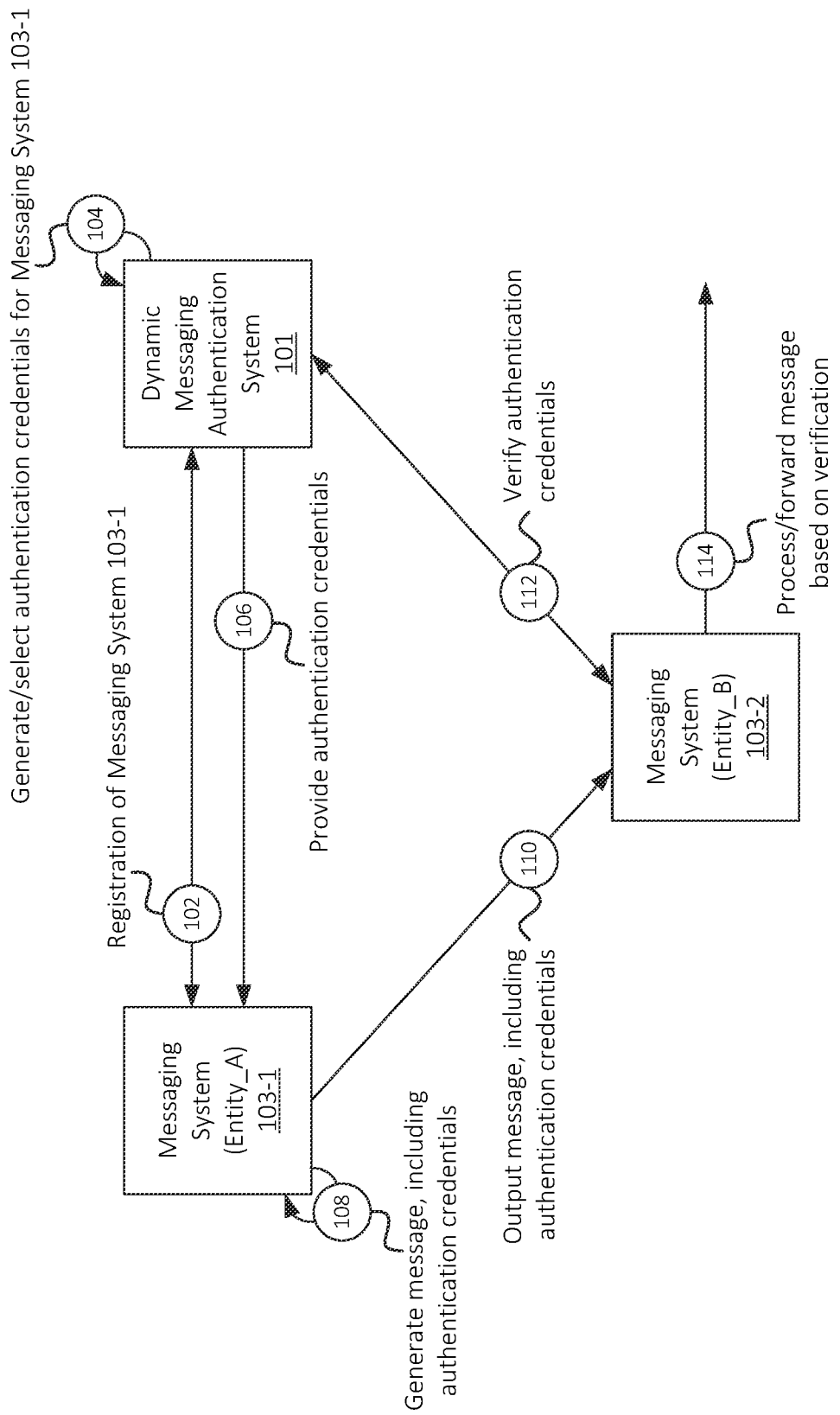
FIG. 1 illustrates an example overview of one or more embodiments described herein.

As shown in FIG. 1, Dynamic Messaging Authentication System ("DMAS") 101 may register (at 102) a particular messaging system 103-1, and/or an entity associated with such messaging system 103-1 (referred to as "Entity_A" in the examples provided herein). As discussed above, the entity may be or may include an organization, an institution, a user, a group of users, etc.

DMAS 101 may implement or provide an application programming interface ("API"), a web portal, a user interface, and/or some other suitable communication pathway via which one or more devices, such as messaging system 103-1 and/or some other device or system associated with one or more entities (e.g., Entity_A) may communicate with DMAS 101. Registering (at 102) messaging system 103-1 may include verifying a user name or password associated with messaging system 103-1 and/or Entity_A, verifying biometric information associated with messaging system 103-1 and/or Entity_A, and/or otherwise authenticating messaging system 103-1 and/or Entity_A. Registering (at 102) messaging system 103-1 may also include determining or verifying a level of authorization associated with messaging system 103-1 and/or Entity_A, such as verifying that messaging system 103-1 and/or Entity_A are an authorized sender of messages in accordance with embodiments described herein. In some embodiments, determining the level of authorization associated with messaging system 103-1 and/or Entity_A may include determining other messaging systems 103 or entities with which messaging system 103-1 is authorized to communicate in accordance with embodiments described herein.

For example, DMAS 101 may determine that messaging system 103-1 is authorized to communicate with messaging system 103-2 (e.g., associated with Entity_B). For example, DMAS 101 may have received authorization from messaging system 103-2 and/or Entity_B, indicating that messaging system 103-1 and/or Entity_A are authorized senders of messages with respect to messaging system 103-2 and/or Entity_B. In some embodiments, DMAS 101 may otherwise determine that messaging system 103-1 and/or Entity_A are authorized message senders with respect to messaging system 103-2 and/or Entity_B.

Based on registering (at 102) messaging system 103-1, which may include determining that messaging system 103-1 is an authorized message sender with respect to messaging system 103-2, DMAS 101 may generate and/or select (at 104) a set of authentication credentials for messaging system 103-1. For example, DMAS 101 may generate one or more cryptographic keys, may generate one or more authentication tokens, may generate one or more passwords, and/or other suitable authentication credentials. In some embodiments, the authentication credentials may specify or indicate that messaging system 103-1 has registered (at 102) with DMAS 101 and/or that messaging system 103-1 is otherwise an authorized sender of messages in accordance with embodiments described herein. Additionally, or alternatively, the authentication credentials may specify or indicate that messaging system 103-2 has authorized messaging system 103-1 to send messages to messaging system 103-2 in accordance with embodiments described herein.

DMAS 101 may provide (at 106) some or all of the authentication credentials to messaging system 103-1. For example, DMAS 101 may provide the one or more cryptographic keys, authentication tokens, etc. to messaging system 103-1. In some embodiments, DMAS 101 may provide the authentication credentials to messaging system 103-1 via a Key Escrow Server ("KES") and/or via some other device or system. The authentication credentials may be provided with one or more identifiers, labels, etc. indicating with which messaging system 103 and/or entity the authentication credentials are associated. In this manner, messaging system 103-1 may register (at 102) with DMAS 101 to communicate with multiple different other messaging systems 103 (e.g., messaging system 103-2 and/or other messaging systems 103), and may maintain separate sets of authentication credentials associated with the different messaging systems 103.

In some embodiments, messaging systems 103 (e.g., messaging system 103-1 and/or messaging system 103-2) may be, may include, may be implemented by, etc. a messaging client (e.g., executing at a User Equipment ("UE") such as a mobile phone, a tablet, a desktop computer, etc.), a messaging server (e.g., an email server, a chat server, etc.), and/or some other suitable device or system. Messaging systems 103 may as discussed above, be associated with different entities and may therefore be implemented by separate and independent sets of devices and may have their own respective sets of policies, rules, etc.

For instance, messaging system 103-1 may include an email system associated with a first domain name, and messaging system 103-2 may include an email system associated with a second domain name. For example, messages sent via messaging system 103-1 may specify a sender identifier (e.g., an email address), where the sender identifier includes the first domain name (e.g., in the format "xxx@[dom1]" where "[dom1]" refers to the first domain), and messages sent via messaging system 103-2 may specify a sender identifier that includes the second domain name (e.g., in the format "xxx@[dom2]" where "[dom2]" refers to the second domain). Messaging system 103-2 may, in some embodiments, be associated with rules, policies, etc. whereby "external" messages (e.g., messages received from a sender identifier that does not include the second domain name) are modified prior to presenting or forwarding the messages. While the sender identifier (e.g., the domain name associated with a sender of a message) is discussed herein as a criteria based on which messaging system 103-2 modifies messages, in some embodiments, different criteria may be used by messaging system 103-2 to determine whether to modify messages.

Figure 2:
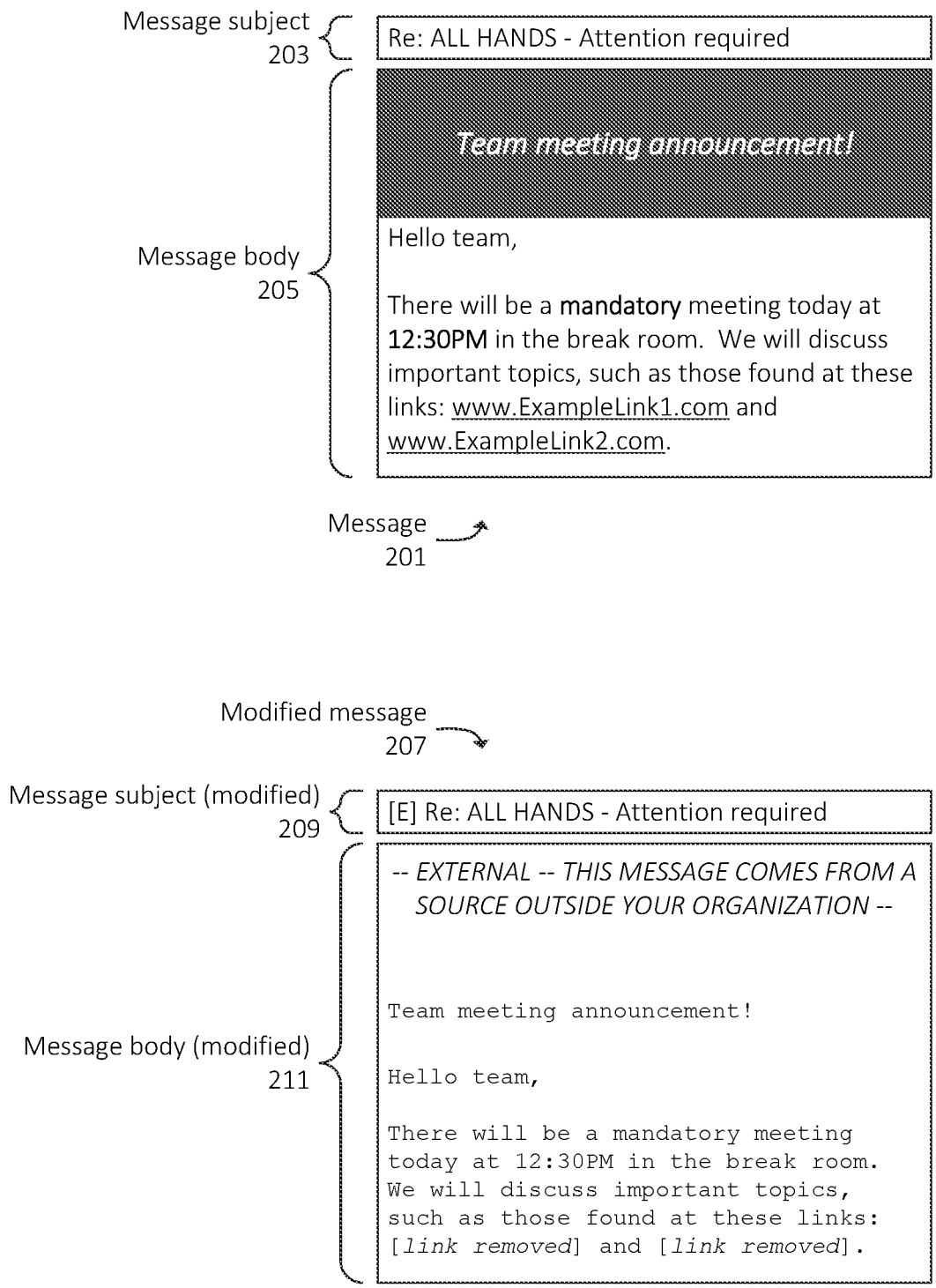
FIG. 2 illustrates an example of an message and a modified version of the message, in accordance with some embodiments.

FIG. 2 illustrates an example of a message 201 that may be modified by messaging system 103-2 (e.g., an external message). The illustration of message 201, in FIG. 2, may represent how message 201 may be displayed in a graphical user interface ("GUI"), such as a GUI associated with a messaging client, an email application, etc. associated with a given messaging system 103 and/or associated with a UE that receives messages from such messaging system 103. In practice, message 201 may be implemented or sent as one or more encoded files or documents, such as one or more Hypertext Markup Language ("HTML") files, one or more Extensible Markup Language ("XML") files, etc. Such encoded files or documents may specify formatting, colors, images, message parts, etc., which may be represented as message 201 in FIG. 2.

For example, message 201 may include subject 203 and message body 205. In this example, message body 205 may include formatting (e.g., bold and/or italic text, text with different sizes, etc.), shading, hyperlinks (e.g., "www.ExampleLink1.com" and "www.ExampleLink2.com", or the like. In other examples, message 201 may include images, videos, audio, etc. In some situations, a given messaging system 103 may receive message 201, and may modify message 201 (e.g., may generate modified message 207 based on message 201). For example, messaging system 103 may receive message 201 and may determine that message 201 is an external message (e.g., is sent from a different domain, a different entity, etc. than messaging system 103), and/or that message 201 should otherwise be modified.

Accordingly, modified message 207 may include modified subject 209, which may include adding an "[E]" to signify that message 201 was received from an external source, and/or may include some other suitable modification. As another example, modified message body 211 may include modified formatting, such as a replacement of all fonts or typefaces in original message body 205 with a standard or default font or typeface. Modified message body 211 may include a removal of shading, images, hyperlinks, or other attributes of original message body 205. In some embodiments, modified message body 211 may include an indication (e.g., "—EXTERNAL—THIS MESSAGE COMES FROM A SOURCE OUTSIDE YOUR ORGANIZATION—") that message 201 was received from an external source. In some embodiments, modified message body 211 may include some other modification based on the determination by messaging system 103 that message 201 is an external message and/or should otherwise be modified.

Situations may arise, however, in which external messages, that would otherwise be modified by messaging system 103 (e.g., as shown in FIG. 2), should not be modified. For example, two separate entities may partner with each other and/or may otherwise "trust" each other, and messages sent between such entities may not need to be modified based on the partnership and/or trust. As another example, some devices or users associated with a first entity may be trusted by a second entity, while other devices or users associated with the first entity may not be trusted by the second entity. As such, messages sent by the trusted users to the second entity may not need to be modified, while messages sent by the untrusted users to the second entity should still be modified. As provided herein, some embodiments allow for the dynamic authorization and authentication of such trusted users, entities, etc., to allow for a given messaging system 103 to selectively modify, restrict, etc. communications from untrusted users or entities without performing such modifications or restrictions on communications from trusted users or entities.

For example, returning to FIG. 1, messaging system 103-1 may generate (at 108) a message to be sent to messaging system 103-2, such as an email, an instant message, etc. The message may include the authentication credentials received (at 106) from DMAS 101. For example, messaging system 103-1 may receive user input specifying that the message should be sent to messaging system 103-2, may receive an instruction from an application executing at messaging system 103-1 and/or some other device, and/or may otherwise determine that a message is to be sent to messaging system 103-2. Messaging system 103-1 may identify the previously received (at 106) authentication credentials based on a domain name or other identifier associated with messaging system 103-2. For example, as discussed above, the authentication credentials provided by DMAS 101 may specify that then authentication credentials are associated with messages to be sent to messaging system 103-2. In some embodiments, DMAS 101 may provide a set of one-time use authentication credentials, and messaging system 103-1 may select (at 108) a particular one-time use authentication credential (e.g., a previously unused authentication credential).

Figure 3A:
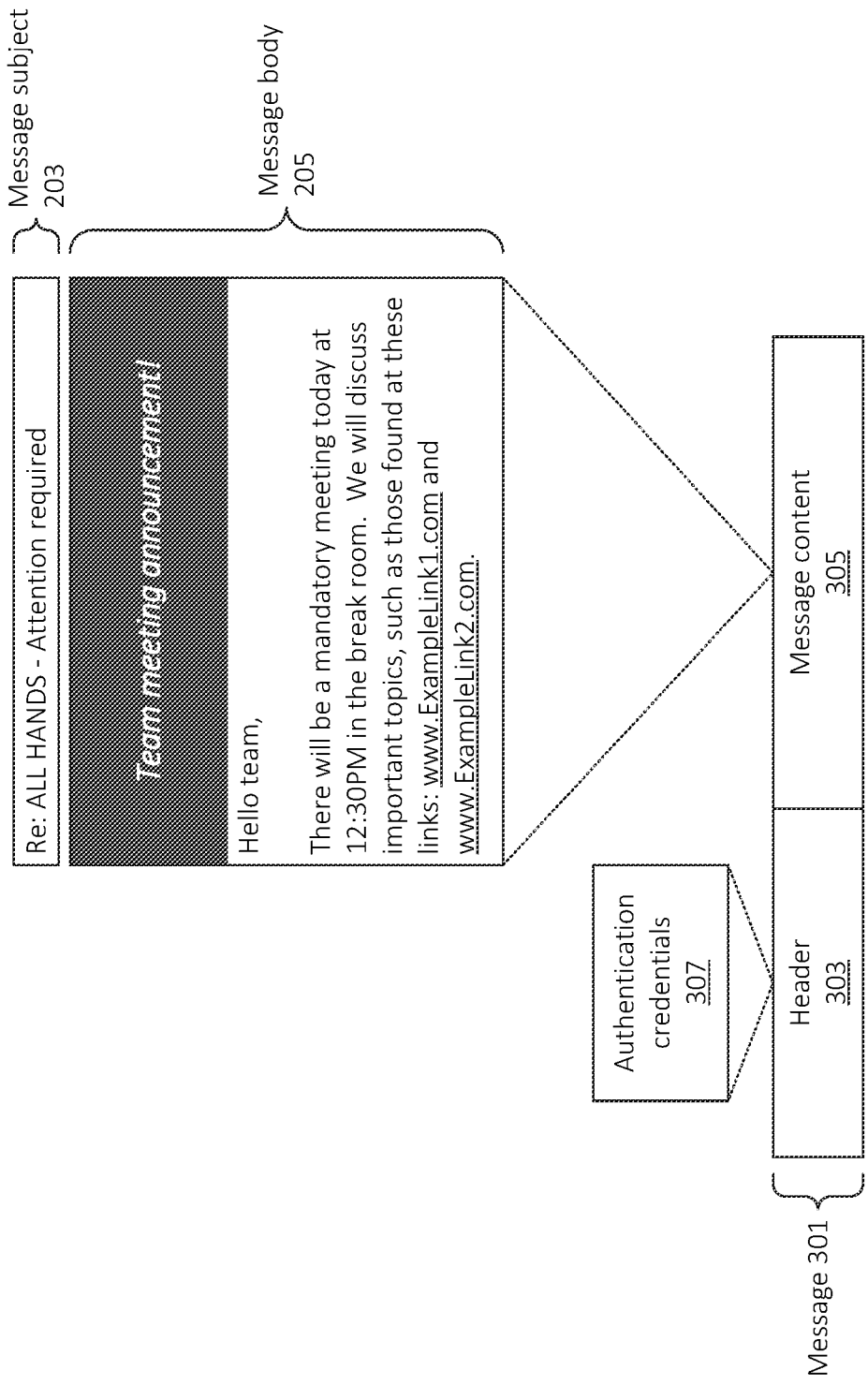
FIGS. 3A and 3B illustrate example messages that include a set of authentication credentials, in accordance with some embodiments.

FIG. 3A illustrates example message 301, which may represent the message generated (at 108) by messaging system 103-1. Message 301 may include header 303, message content 305, and/or additional or different components or attributes. Header 303 may include information such as message type, sender identifier (e.g., domain name, email address, Internet Protocol ("IP") address, user name, etc.), "reply to" information, destination and/or recipient identifier, and/or other suitable message attributes, metadata, etc. In some embodiments, header 303 may include authentication credentials 307. For example, messaging system 103-1 may include authentication credentials 307 in header 303 based on identifying that message 301 is being sent to messaging system 103-2, with which authentication credentials 307 are associated. In some embodiments, as discussed above, authentication credentials 307 may be one-time use authentication credentials selected from a set of one-time use authentication credentials provided to messaging system 103-1. In some embodiments, header 303 may include a flag, label, etc. indicating the presence of authentication credentials 307.

In this example, message content 305 includes message 201, including subject 203 and message body 205. Although shown in a graphical representation, message 201 may be encoded, represented, included, etc. in message content 305 as one or more files, documents, etc., as discussed above. In some embodiments, header 303 may be unencrypted or otherwise accessible by devices that receive message 301 (e.g., one or more routers, gateways, switches, etc.), while message content 305 may be encrypted or otherwise inaccessible by such devices. For example, message content 305 may be encrypted via one or more encryption techniques, and may be able to be decrypted by an intended recipient of message 301.

Returning to FIG. 1, messaging system 103-1 may output (at 110) the message (e.g., message 301) to messaging system 103-2 via one or more networks, such as the Internet, a mobile network, one or more private networks, etc. For example, one or more networks or network devices such as routers, gateways, etc. may identify messaging system 103-2 as the recipient of message 301 based on information included in header 303. Messaging system 103-2 may receive message 301 and may identify authentication credentials 307 included in message 301, which may be included in header 303. In some embodiments, messaging system 103-2 may identify a flag, label, etc. indicating the presence of authentication credentials 307.

Messaging system 103-2 may verify (at 112) authentication credentials 307 included in message 301. For example, messaging system 103-2 may communicate with DMAS 101 to verify authentication credentials 307 or, in some embodiments, may verify authentication credentials 307 without communicating with DMAS 101. Messaging system 103-2 and/or DMAS 101 may for example, verify that an authentication token included in message 301 matches an authentication token previously provided (e.g., at 106) to messaging system 103-1. In some embodiments, when verifying (at 112) authentication credentials 307, messaging system 103-2 and/or DMAS 101 may maintain information that the particular authentication credentials 307 have been used for message 301. In the event that authentication credentials 307 include one-time use credentials, messaging system 103-2 and/or DMAS 101 may subsequently not authenticate, may deny, and/or may otherwise not verify the same authentication credentials 307 if they are provided again. For example, messaging system 103-2 and/or DMAS 101 may verify that authentication credentials 307, included in message 301, have not been previously used before, in the event that authentication credentials 307 include a one-time use credential.

Figure 4:
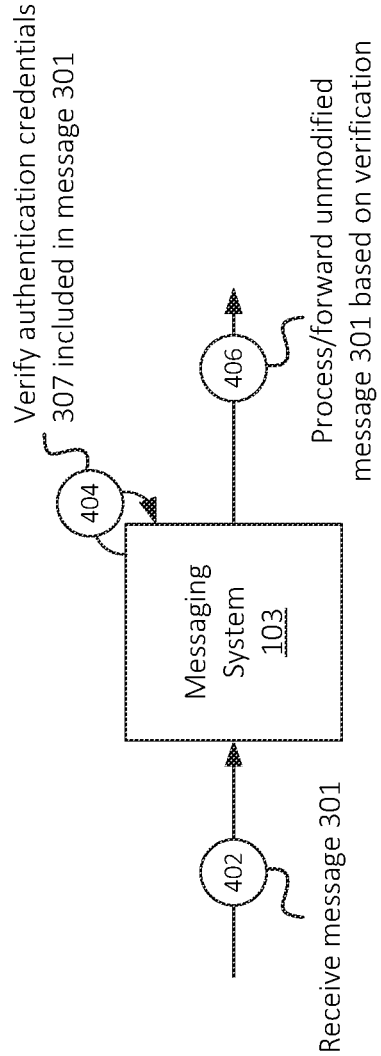
FIG. 4 illustrates an example of processing a message, without modifying the message, based on verifying authentication credentials included in the message, in accordance with some embodiments.

Messaging system 103-2 may proceed to process and/or forward (at 114) message 301 based on whether authentication credentials 307 were verified or not verified. For example, as discussed above, messaging system 103-2 may modify message 301 in situations where authentication credentials 307 were not verified or authenticated (at 112), while messaging system 103-2 may forgo modifying message 301 in situations where authentication credentials 307 were verified or authenticated (at 112). For example, as shown in FIG. 4, a particular messaging system 103 may receive (at 402) a given message 301, which may include a set of authentication credentials 307 (e.g., in header 303 of message 301). Messaging system 103 may verify (at 404) authentication credentials 307 included in message 301, which may include communicating with DMAS 101 in order to verify authentication credentials 307, in some embodiments. Since authentication credentials 307 have been verified (at 404), messaging system 103 may proceed to process and/or forward (at 406) the original, unmodified message 301.

For example, messaging system 103 may forward message 301 to an indicated recipient without modifying message 301. Additionally, or alternatively, messaging system 103 may modify a portion of message 301, such as header 303 (e.g., may change a sender or recipient IP address based on a Network Address Translation ("NAT") technique and/or some other routing technique), but may forgo modifying other portions of message 301 (e.g., may forgo modifying message content 305 of message 301). In some embodiments, messaging system 103 may modify a portion of message content 305, but may forgo modifying portions of message content 305 that include or that pertain to subject 203, message body 205, or some other message part. In some embodiments, messaging system 103 may modify a portion of subject 203 and/or message body 205 to indicate that authentication credentials 307 of message 301 have been verified, such as by including text, images, and/or other content into message 301 (e.g., inserting such information into header 303 and/or to message content 305) indicating that authentication credentials 307 of message 301 have been verified. In some embodiments, messaging system 103 may modify a portion of message body 205 for verified senders.

For example, messaging system 103 may parse or otherwise analyze an HTML file, an XML file, and/or other file or data structure that includes or encodes message body 205 in order to identify one or more links, Uniform Resource Locators ("URLs"), etc. included in message body 205. Messaging system 103 may modify such HTML file, XML file, etc. to include text, images, and/or other indicators that the links, URLs, etc. are safe, trusted, etc. by virtue of message 301 having been sent by a verified sender (e.g., including verified authentication credentials 307).

Figure 3B:
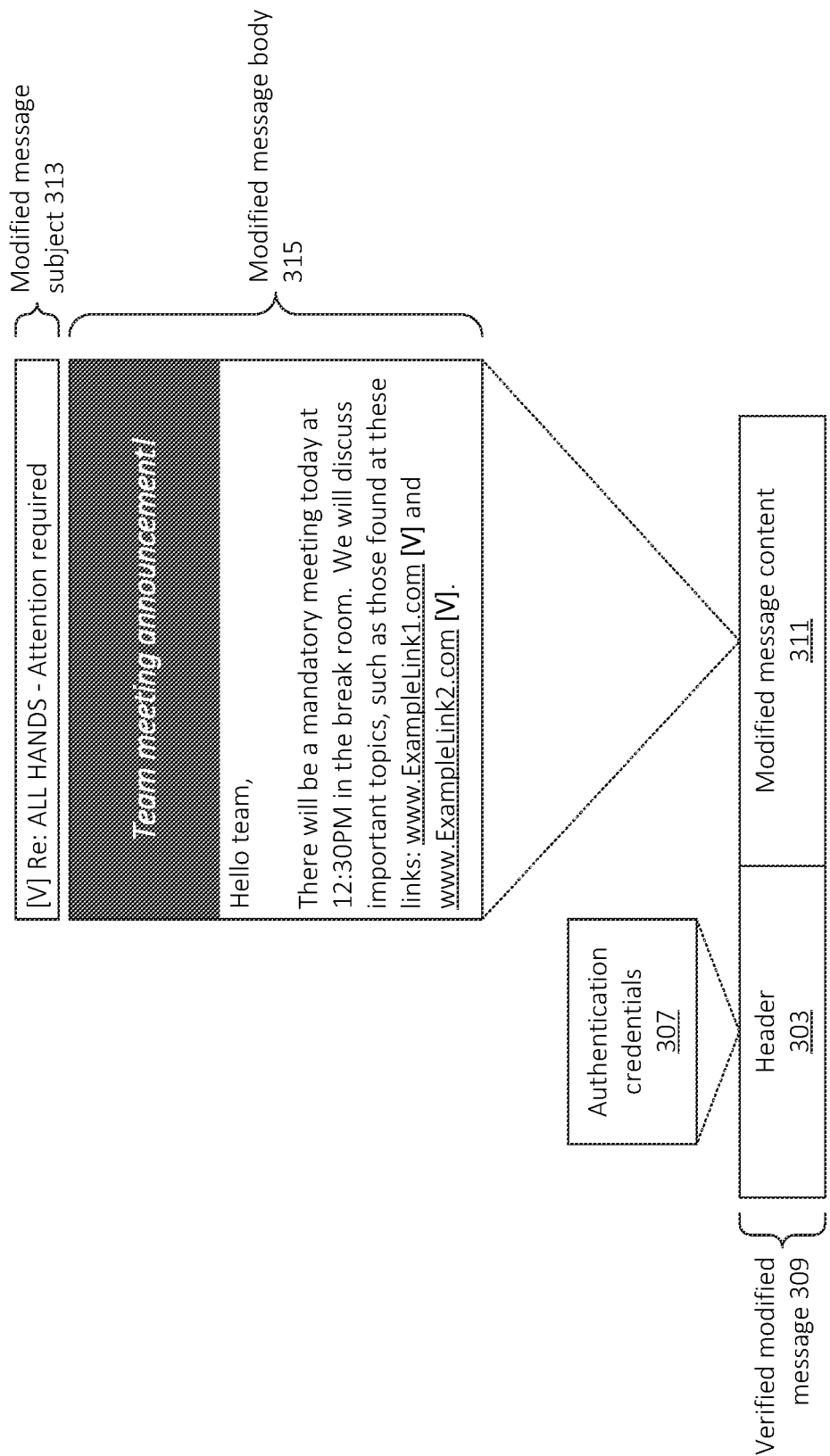

FIG. 3B illustrates an example of verified modified message 309, which may be generated (at 406) by messaging system 103 based on verifying (at 404) a sender of original message 301 (e.g., receiving an indication from DMAS 101 that the sender of message 301 has been verified based on authentication credentials 307). Verified modified message 309 may include modified message content 311, which may include modified message subject 313 and/or modified message body 315. As shown, modified message subject 313 may include a "[V]" prepended to original subject 203. As further shown, modified message body 315 may include a "[V]" placed proximate to links included in original message body 205. Such indications may be included "proximate to" links inasmuch as the indications may be separated from the links by a space, a dash, and/or one or more other characters. In some embodiments, such indications may be placed proximate to links by including image or positioning data in the HTML file, XML file, etc. for the indications relative to positioning data of the links themselves. In some embodiments, modified message subject 313 and/or modified message body 315 may include other indications of a verified sender (and/or links that are safe, trusted, etc. based on the verification of the sender), such as images, icons, etc.

In some embodiments, messaging system 103 may parse and/or otherwise analyze links themselves, such as by identifying whether a link is authorized (e.g., is associated with a particular authorized domain, URL, IP address, etc.) in addition to the operations described above. For example, messaging system 103 may identify that a particular link, included in message 301 from a verified sender, is authorized. The "[V]" or other authorization indicator may be included based on identifying that the link is authorized in addition to the sender being authorized. On the other hand, situations may arise in which a sender is authorized but a link is not authorized. In such examples, the link may be removed, obscured, etc., while other portions of the message (e.g., subject link and/or other portions of the message body) may be modified to include an indicator that the sender is authorized, and/or may be unmodified based on determining that the sender is authorized.

In this sense, the handling or processing of messages 301 with valid or verified authentication credentials 307 may be different from the handling or processing of messages 301 with invalid or non-verified authentication credentials 307, or no authentication credentials 307 at all. For example, while examples herein are presented in the context of messages from verified senders being forwarded in an unmodified state, in some embodiments similar concepts may be used (e.g., the verification of a sender based on authentication credentials 307) to perform different modifications to messages based on whether the sender has been verified or not.

In some embodiments, as discussed above, messaging system 103 may include a device or system that forwards message 301 to an intended recipient, such as an electronic mail server, a messaging server, etc. In some embodiments, messaging system 103 may be a messaging application executing locally at a UE of the intended recipient of message 301. In such embodiments, messaging system 103 may present (e.g., via a GUI) message 301 in its original, unmodified state. Additionally, or alternatively, as discussed above, messaging system 103 may present message 301 according to modifications that were performed based on verifying (at 404) authentication credentials 307, and/or may otherwise present indications such as text, icons, etc. overlaid over portions of message 301 in the GUI.

Figure 5:
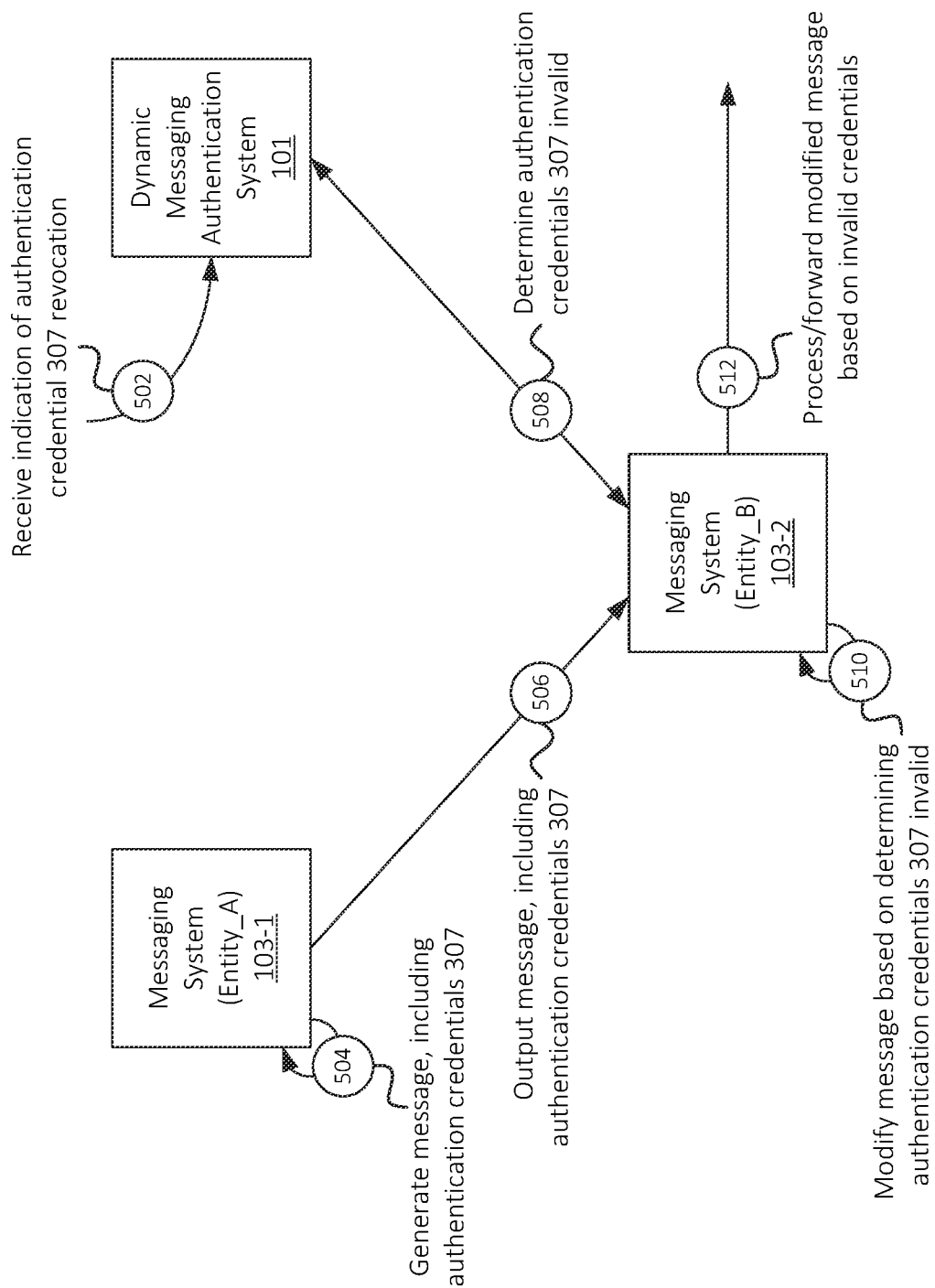
FIG. 5 illustrates an example of modifying a message, based on determining that the message does not include valid authentication credentials, in accordance with some embodiments.

For example, as shown in FIG. 5, DMAS 101 may receive (at 502) an indication that authentication credentials 307, associated with messaging system 103-1, have been revoked. For example, messaging system 103-2, Entity_B, and/or some other authorized source may indicate that Entity_A is no longer a trusted message sender with respect to messaging system 103-2. As another example, messaging system 103-2, Entity_A, Entity_B, and/or some other authorized source may indicate that messaging system 103-1 (e.g., a particular UE or other device) is no longer a trusted message sender with respect to messaging system 103-2, such as in situations where messaging system 103-1 is a device that has been lost or stolen. As yet another example, as discussed above, DMAS 101 may revoke a particular one-time use credential when such credential is used in a message (e.g., message 301). As another example, DMAS 101 may revoke authentication credentials 307 associated with a given entity when messages from the given entity (e.g., messages including one or more authentication credentials 307 associated with the given entity) exceed a rate limit, such as greater than a threshold quantity of such messages over a particular timeframe. In this manner, granular control over authentication credentials 307 may be provided, such that entire groups of devices or users, or individual devices or users, may be indicated as verified (or not verified) senders of messages with respect to a given messaging system 103.

As further shown, messaging system 103-1 may generate (at 504) a message, including authentication credentials 307 which were revoked (at 502). Messaging system 103-1 may output (at 506) the message, including the revoked credentials, to messaging system 103-2. Messaging system 103-2 may determine (at 508) that authentication credentials 307 are invalid, such as by communicating with DMAS 101 or otherwise determining that authentication credentials 307 are invalid. As discussed above, authentication credentials 307 may be invalid by virtue of having previously been revoked (at 502).

Based on determining (at 508) that authentication credentials 307 are invalid, messaging system 103-2 may modify (at 510) the received message. For example, as discussed above with respect to FIG. 2, messaging system 103-2 may modify a payload of the message, which may include modifying subject 203 and/or message body 205 of the message (e.g., to generate modified subject 209 and/or modified message body 211). In some embodiments, messaging system 103-2 may perform different modifications, and/or may perform different operations, such as dropping or rejecting (e.g., not forwarding) the message, removing or "cutting" portions of the message that exceed a particular size, and/or other suitable operations. Messaging system 103-2 may process and/or forward (at 512) the modified message (e.g., modified message 207). For example, as discussed above, messaging system 103-2 may forward the modified message toward an intended recipient, and/or may present the modified message via a GUI or in some other suitable manner. As such, a recipient of the modified message may be able to ascertain that a source of the message is external, untrusted, etc. Additionally, the modifications may prevent potentially unwanted or unauthorized actions, such as clicking hyperlinks.

In some embodiments, some messaging systems 103 may utilize other techniques for identifying external and/or unauthorized senders of messages in addition to, or in lieu of, the techniques described above. For example, as shown in FIG.

Figure 7:
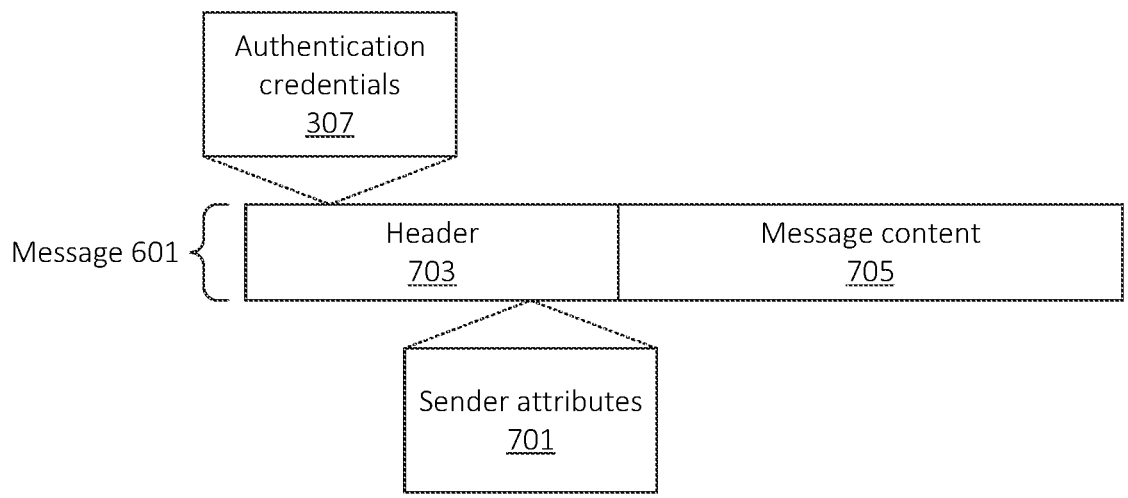
FIGS. 7 and 8 illustrate example messages that may be processed without modification based on sender attributes.
Figure 8:
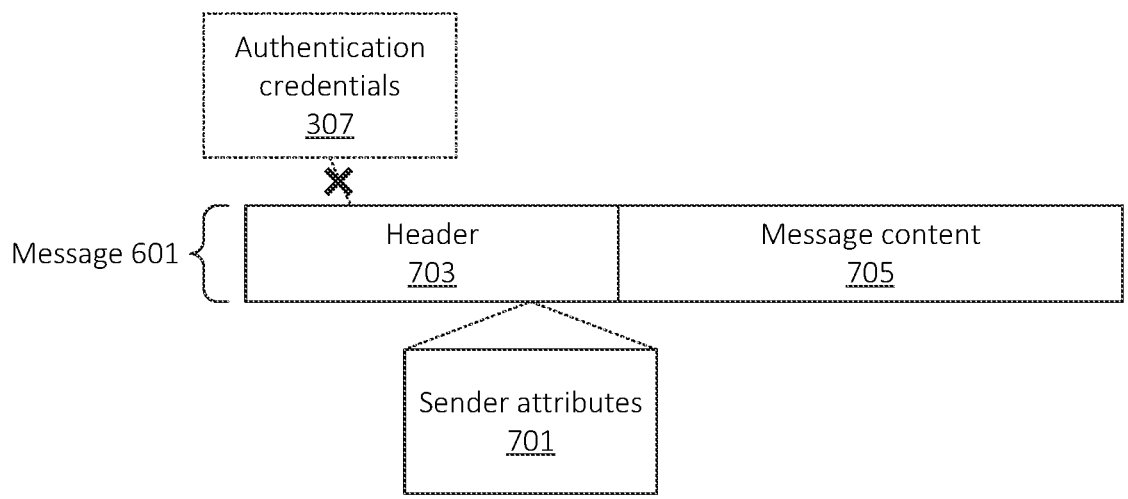

6, a given messaging system 103 may receive (at 602) a particular message 601. Message 601 may as shown in FIG. 7, include a set of sender attributes 701 (e.g., in header 703 of message 601). Sender attributes 701 may include, for example, an IP address, user name, Mobile Directory Number ("MDN"), UE identifier (e.g., International Mobile Subscriber Identity ("IMSI"), International Mobile Station Equipment Identity ("IMEI"), etc.), and/or some other identifier associated with a user or UE from which message 601 was received. Additionally, or alternatively, sender attributes 701 may include a group name, a label, and/or some other value. In some embodiments, as shown in FIG. 7, message 601 may include a set of authentication credentials 307. On the other hand, in some embodiments, and as shown in FIG. 8, message 601 may not include a set of authentication credentials 307.

Figure 6:
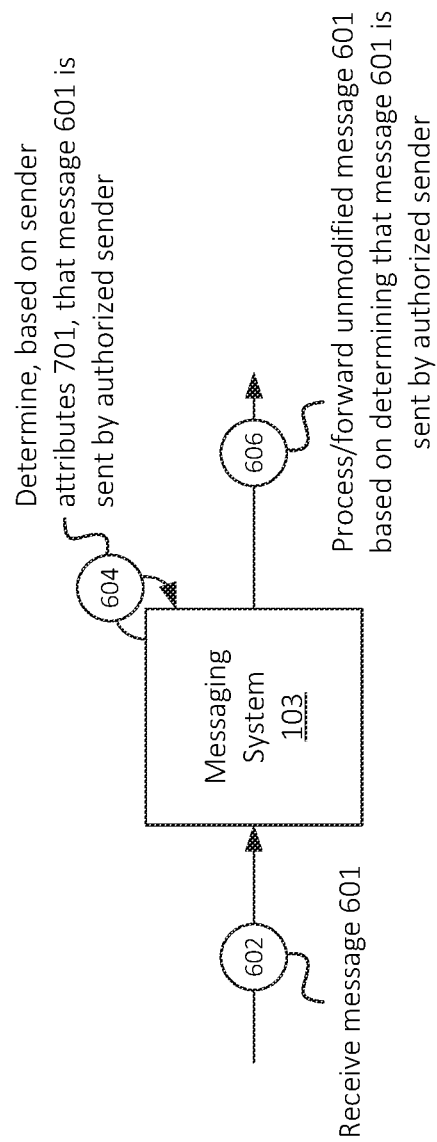
FIG. 6 illustrates an example of processing a message, without modifying the message, based on verifying sender attributes associated with the message.

Returning to FIG. 6, messaging system 103 may determine (at 604), based on sender attributes 701 of message 601, that message 601 is sent by an authorized sender. For example, messaging system 103 may be associated with a particular domain, and sender attributes 701 may indicate that message 601 was sent from the same domain. As another example, messaging system 103 may maintain "trust" list or other indication of trusted or authorized devices and/or users. Messaging system 103 may based on determining (at 604) that message 601 has been sent by an authorized sender, process and/or forward (at 606) message 601, without modifying message 601 (e.g., without modifying message content 705 of message 601, without modifying one or more message parts of message 601, etc. as discussed above).

In some embodiments, messaging system 103 may determine (at 604) that message 601 has been sent by an authorized sender based on the sender attributes 701 of message 601, and independent of authentication credentials 307 that may or may not be included in message 601. For example, even if message 601 did not include authentication credentials 307 (e.g., as shown in FIG. 8), or included invalid authentication credentials 307, messaging system 103 may still determine (at 307) that the sender is an authorized sender, by virtue of determining that the sender is authorized based on sender attributes 701. As such, the verification of authentication credentials 307 may provide for a more dynamic, agile, and granular mechanism by which messages and/or their senders may be verified and handled accordingly.

Figure 9:
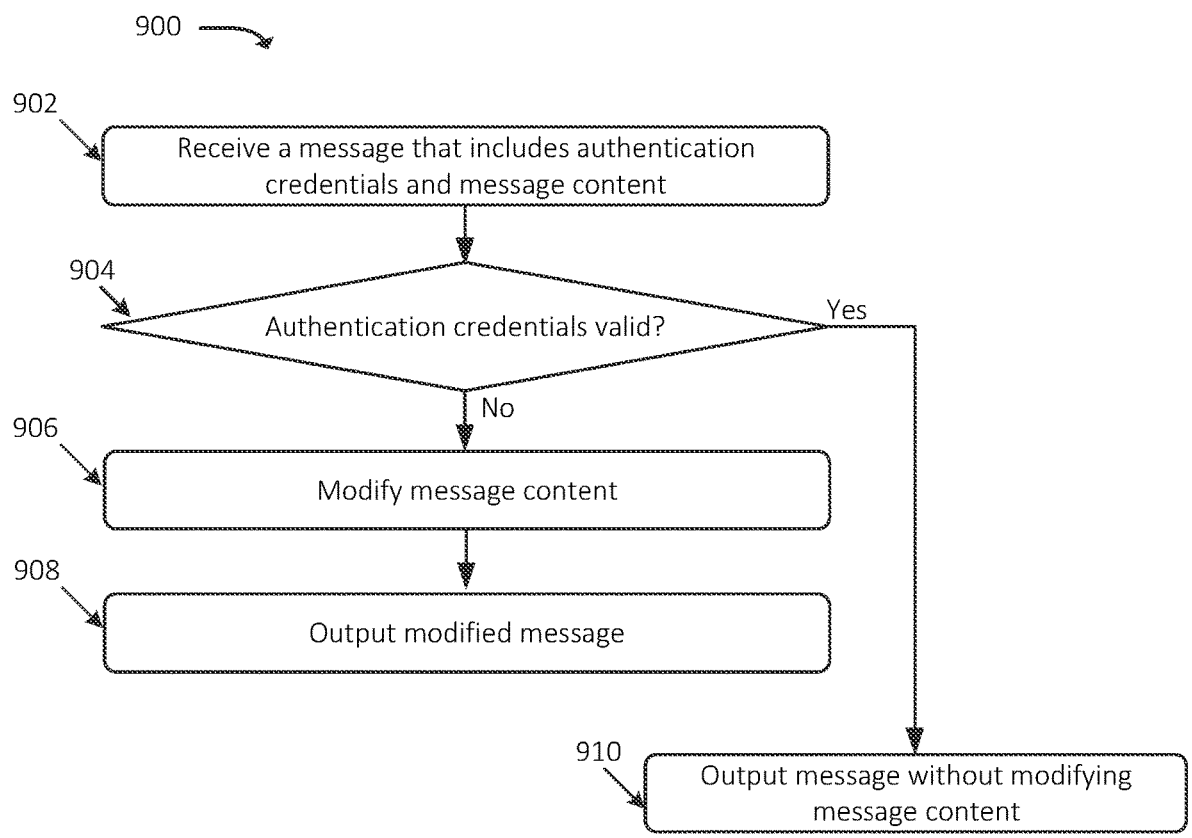
FIG. 9 illustrates an example process for processing a message based on verifying authentication credentials included in the message, in accordance with some embodiments.

FIG. 9 illustrates an example process 900 for processing a message based on verifying authentication credentials included in the message. In some embodiments, some or all of process 900 may be performed by messaging system 103 (e.g., a particular messaging system 103 that receives a message from another messaging system 103 and/or from some other source). In some embodiments, one or more other devices may perform some or all of process 900 in concert with, and/or in lieu of, messaging system 103, such as DMAS 101 and/or some other device or system.

As shown, process 900 may include receiving (at 902) a message that includes a set of authentication credentials and message content. As discussed above, messaging system 103 may receive a message, such as an email, an instant message, and/or some other type of message. The message may include header information, metadata, etc. in addition to message content (e.g., a payload of the message). The message content may include, for example, a subject line, a message body, one or more attachments, and/or other information. In some embodiments, the authentication credentials may be included in header information, metadata, etc. That is, in some embodiments, the authentication credentials may be separate, distinct, independent, etc. from the message content.

Process 900 may further include determining (at 904) whether the received authentication credentials are valid. For example, messaging system 103, DMAS 101, and/or some other device or system may compare the authentication credentials to a set of authentication credentials previously provided to one or more entities (e.g., another messaging system 103, a UE, an organization, etc.). In some embodiments, messaging system 103, DMAS 101, and/or some other device or system may compare other information associated with the message, such as a sender of the message, a domain associated with a sender of the message, etc. to registration information associated with the authentication credential when verifying the authentication credential. For example, messaging system 103, DMAS 101, etc. may verify that the authentication credential matches a previously issued authentication credential, as well as verifying that a sender of the message is authorized to use the authentication credential (e.g., is associated with the same entity that registered for the authentication credential and/or is otherwise authorized to utilize the authentication credential).

In some embodiments, verifying the authentication credential may be a separate procedure that is independent of and/or additional to verifying a sender of the message. For example, messaging system 103 may in some instances, identify sender attributes such as a domain associated with the sender of the message, a user name associated with the sender of the message, etc. In some instances, if messaging system 103 verifies the sender of the message based on the sender attributes (e.g., the sender is associated with the same domain as the recipient, and/or is otherwise authorized to communicate with the recipient), then messaging system 103 may forgo analyzing the authentication credentials of the message. In this manner, different techniques may be used to verify message senders, and messaging system 103 may not be constrained to only verify whether a message sender is authorized solely based on authentication credentials included in messages as described herein.

If the authentication credentials are not valid (at 904—NO), then process 900 may include modifying (at 906) the message content. For example, messaging system 103 may modify a message body by removing hyperlinks, altering fonts, removing formatting, removing images, removing text that exceeds a threshold quantity of characters, etc. As another example, messaging system 103 may modify a message subject by adding characters (e.g., letters, numbers, symbols, emojis, etc.), removing text that exceeds a threshold quantity of characters, etc. As yet another example, messaging system 103 may modify message content by removing one or more attachments that were included in the message. Process 900 may also include outputting (at 908) the modified message. For example, messaging system 103 may present the modified message via a GUI, may forward the modified message toward an indicated recipient, etc.

If, on the other hand, the authentication credentials are verified (at 904—YES), process 900 may further include outputting (at 910) the message without modifying the message content. For example, messaging system 103 may present the original message content via a GUI, forward the message toward an indicated recipient, etc. In some embodiments, when determining that the authentication credentials are verified (at 904—YES), messaging system 103 may modify header information, metadata, etc. associated with the message prior to outputting (at 910) the message. In some embodiments, messaging system 103 may modify message content of verified messages, but in a different manner than modifications performed on non-verified messages. For example, messaging system 103 may add the characters "[E]" to the subject line of a message that has not been verified (e.g., at 904—NO), while messaging system 103 may add the characters "[V]" to the subject link of a message that has been verified (e.g., at 904—YES). Thus, messages that include a valid authentication token may be handled differently (e.g., modified in a different way, or not modified at all) than messages that do not include a valid authentication token. In some embodiments, the handling of messages that include a valid authentication token may be the same as the handling of messages that do not include a valid authentication token, but are deemed authorized or valid based on one or more other factors, such as sender attributes (e.g., being associated with the same domain as a recipient of the message or based on other sender attributes).

Figure 10:
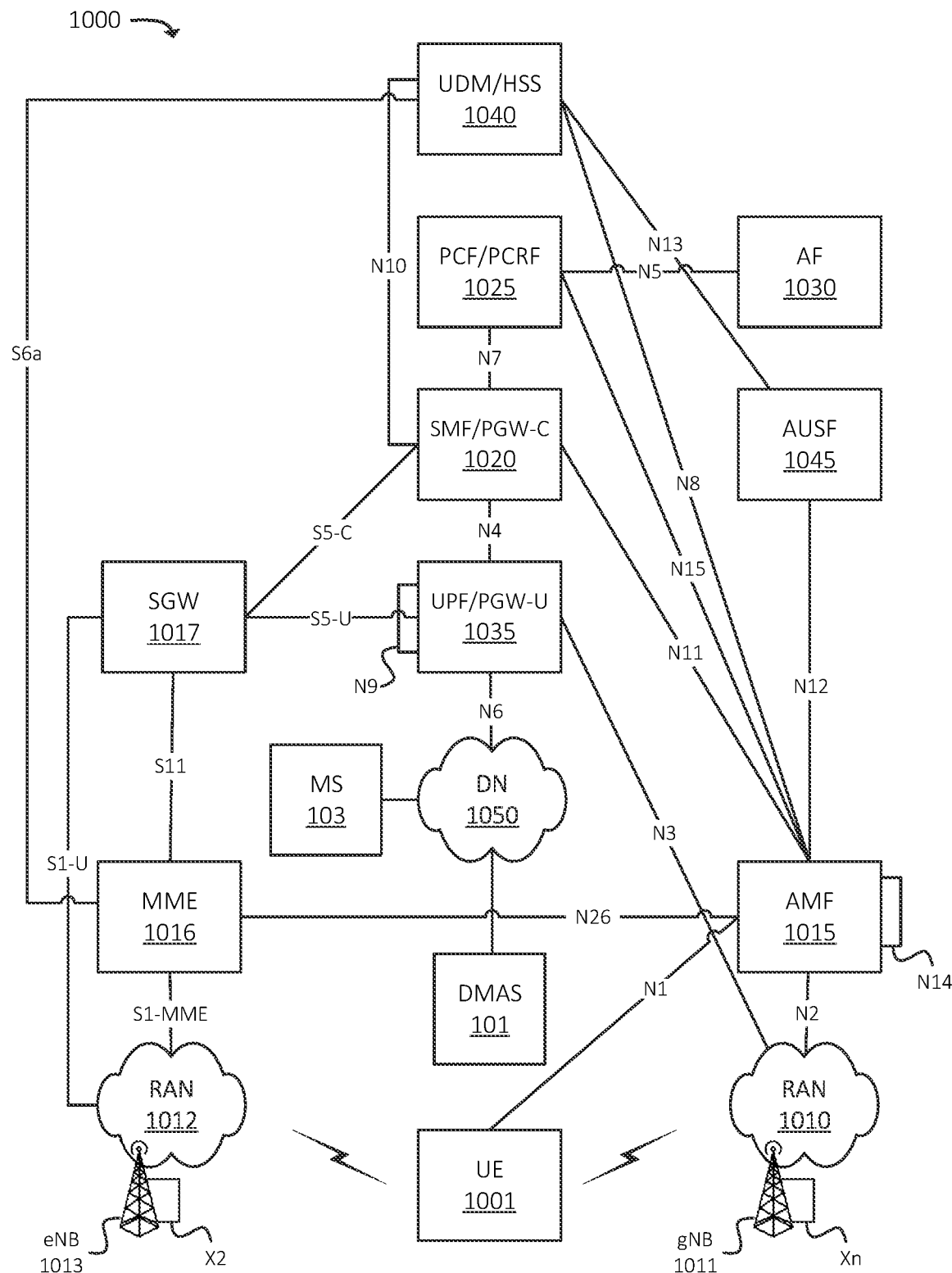
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1000 may represent or may include a 5G core ("5GC"). As shown, environment 1000 may include UE 1001, RAN 1010 (which may include one or more Next Generation Node Bs ("gNBs") 1011), RAN 1012 (which may include one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Unified Data Management ("UDM")/Home Subscriber Server ("HSS") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as DMAS 101 and/or one or more messaging systems 103.

The example shown in FIG. 10 illustrates one instance of each network component or function (e.g., one instance of SMF/PGW-C 1020, PCF/PCRF 1025, UPF/PGW-U 1035, UDM/HSS 1040, and/or AUSF 1045). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF/PGW-C 1020, PCF/PCRF 1025, UPF/PGW-U 1035, UDM/HSS 1040, and/or AUSF 1045, while another slice may include a second instance of SMF/PGW-C 1020, PCF/PCRF 1025, UPF/PGW-U 1035, UDM/HSS 1040, and/or AUSF 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. In some implementations, one or more devices of environment 1000 may be physically integrated in, and/or may be physically attached to, one or more other devices of environment 1000. Alternatively, or additionally, one or more of the devices of environment 1000 may perform one or more network functions described as being performed by another one or more of the devices of environment 1000.

Elements of environment 1000 may interconnect with each other and/or other devices via wired connections, wireless connections, or a combination of wired and wireless connections. Examples of interfaces or communication pathways between the elements of environment 1000, as shown in FIG. 10, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 10, such as Service-Based Interfaces ("SBIs"), including an Namf interface, an Nudm interface, an Npcf interface, an Nupf interface, an Nnef interface, an Nsmf interface, and/or one or more other SBIs.

UE 1001 may include a computation and communication device, such as a wireless mobile communication device that is capable of communicating with RAN 1010, RAN 1012, and/or DN 1050. UE 1001 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 1001 may send traffic to and/or receive traffic (e.g., user plane traffic) from DN 1050 via RAN 1010, RAN 1012, and/or UPF/PGW-U 1035. In some embodiments, UE 1001 may implement, may include, may be communicatively coupled to, and/or may otherwise be associated with DMAS 101 and/or messaging system 103.

RAN 1010 may be, or may include, a 5G RAN that includes one or more base stations (e.g., one or more gNBs 1011), via which UE 1001 may communicate with one or more other elements of environment 1000. UE 1001 may communicate with RAN 1010 via an air interface (e.g., as provided by gNB 1011). For instance, RAN 1010 may receive traffic (e.g., user plane traffic such as voice call traffic, data traffic, messaging traffic, etc.) from UE 1001 via the air interface, and may communicate the traffic to UPF/

PGW-U 1035 and/or one or more other devices or networks. Further, RAN 1010 may receive signaling traffic, control plane traffic, etc. from UE 1001 via the air interface, and may communicate such signaling traffic, control plane traffic, etc. to AMF 1015 and/or one or more other devices or networks. Additionally, RAN 1010 may receive traffic intended for UE 1001 (e.g., from UPF/PGW-U 1035, AMF 1015, and/or one or more other devices or networks) and may communicate the traffic to UE 1001 via the air interface.

RAN 1012 may be, or may include, a LTE RAN that includes one or more base stations (e.g., one or more eNBs 1013), via which UE 1001 may communicate with one or more other elements of environment 1000. UE 1001 may communicate with RAN 1012 via an air interface (e.g., as provided by eNB 1013). For instance, RAN 1012 may receive traffic (e.g., user plane traffic such as voice call traffic, data traffic, messaging traffic, signaling traffic, etc.) from UE 1001 via the air interface, and may communicate the traffic to UPF/PGW-U 1035 (e.g., via SGW 1017) and/or one or more other devices or networks. Further, RAN 1012 may receive signaling traffic, control plane traffic, etc. from UE 1001 via the air interface, and may communicate such signaling traffic, control plane traffic, etc. to MME 1016 and/or one or more other devices or networks. Additionally, RAN 1012 may receive traffic intended for UE 1001 (e.g., from UPF/PGW-U 1035, MME 1016, SGW 1017, and/or one or more other devices or networks) and may communicate the traffic to UE 1001 via the air interface.

AMF 1015 may include one or more devices, systems, Virtualized Network Functions ("VNFs"), Cloud-Native Network Functions ("CNFs"), etc., that perform operations to register UE 1001 with the 5G network, to establish bearer channels associated with a session with UE 1001, to hand off UE 1001 from the 5G network to another network, to hand off UE 1001 from the other network to the 5G network, manage mobility of UE 1001 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, CNFs, etc., that perform operations to register UE 1001 with the EPC, to establish bearer channels associated with a session with UE 1001, to hand off UE 1001 from the EPC to another network, to hand off UE 1001 from another network to the EPC, manage mobility of UE 1001 between RANs 1012 and/or eNBs 1013, and/or to perform other operations.

SGW 1017 may include one or more devices, systems, VNFs, CNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, CNFs, etc., that gather, process, store, and/or provide information in a manner described herein. SMF/PGW-C 1020 may, for example, facilitate the establishment of communication sessions on behalf of UE 1001. In some embodiments, the establishment of communications sessions may be performed in accordance with one or more policies provided by PCF/PCRF 1025.

PCF/PCRF 1025 may include one or more devices, systems, VNFs, CNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, CNFs, etc., that receive, store, and/or provide information that may be used in determining parameters (e.g., quality of service parameters, charging parameters, or the like) for certain applications.

UPF/PGW-U 1035 may include one or more devices, systems, VNFs, CNFs, etc., that receive, store, and/or provide data (e.g., user plane data). For example, UPF/PGW-U 1035 may receive user plane data (e.g., voice call traffic, data traffic, etc.), destined for UE 1001, from DN 1050, and may forward the user plane data toward UE 1001 (e.g., via RAN 1010, SMF/PGW-C 1020, and/or one or more other devices). In some embodiments, multiple UPFs 1035 may be deployed (e.g., in different geographical locations), and the delivery of content to UE 1001 may be coordinated via the N9 interface (e.g., as denoted in FIG. 10 by the line marked "N9" originating and terminating at UPF/PGW-U 1035). Similarly, UPF/PGW-U 1035 may receive traffic from UE 1001 (e.g., via RAN 1010, RAN 1012, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

UDM/HSS 1040 and AUSF 1045 may include one or more devices, systems, VNFs, CNFs, etc., that manage, update, and/or store, in one or more memory devices associated with AUSF 1045 and/or UDM/HSS 1040, profile information associated with a subscriber. AUSF 1045 and/or UDM/HSS 1040 may perform authentication, authorization, and/or accounting operations associated with the subscriber and/or a communication session with UE 1001.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1001 may communicate, through DN 1050, with data servers, other UEs 1001, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1001 may communicate.

Figure 11:
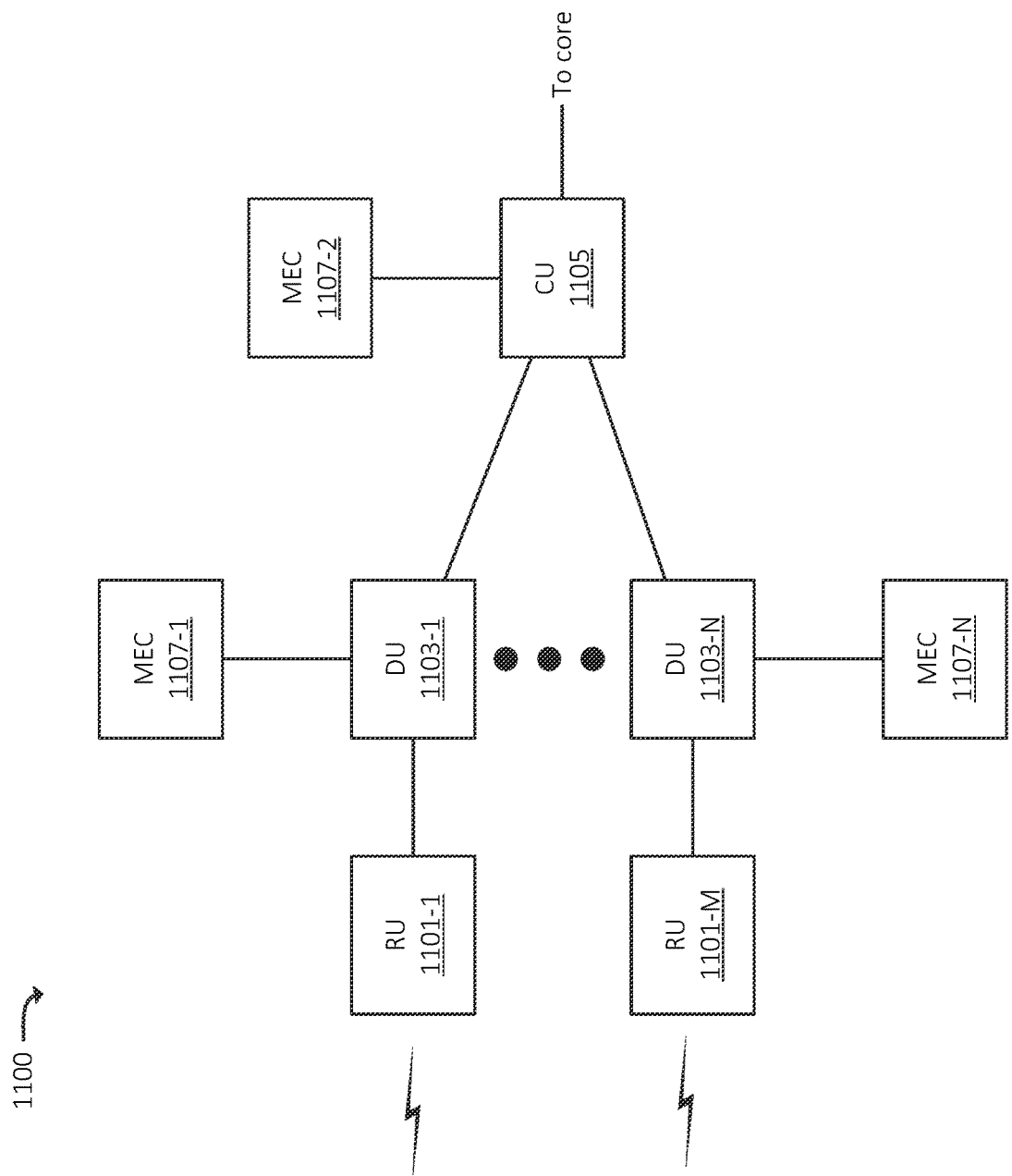
FIG. 11 illustrates an example arrangement of a radio access network ("RAN"), in accordance with some embodiments.

FIG. 11 illustrates an example RAN environment 1100, which may be included in and/or implemented by one or more RANs (e.g., RAN 1010, RAN 1012, or some other RAN). In some embodiments, a particular RAN may include one RAN environment 1100. In some embodiments, a particular RAN may include multiple RAN environments 1100. In some embodiments, RAN environment 1100 may correspond to a particular gNB 1011 of a 5G RAN (e.g., RAN 1010). In some embodiments, RAN environment 1100 may correspond to multiple gNBs 1011. In some embodiments, RAN environment 1100 may correspond to one or more other types of base stations of one or more other types of RANs. As shown, RAN environment 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 1001 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1001, and may determine which DU(s) 1103 should receive the downlink traffic. DU 1103 may include one or more devices that transmit traffic between a core network (e.g., via CU 1105) and UE 1001 (e.g., via a respective RU 1101). DU 1103 may for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1001.

RU 1101 may include hardware circuitry (e.g., one or more RF transceivers, antennas, radios, and/or other suitable hardware) to communicate wirelessly (e.g., via an RF interface) with one or more UEs 1001, one or more other DUs 1103 (e.g., via RUs 1101 associated with DUs 1103), and/or any other suitable type of device. In the uplink direction, RU 1101 may receive traffic from UE 1001 and/or another DU 1103 via the RF interface and may provide the traffic to DU 1103. In the downlink direction, RU 1101 may receive traffic from DU 1103, and may provide the traffic to UE 1001 and/or another DU 1103.

One or more elements of RAN environment 1100 may in some embodiments, be communicatively coupled to one or more Multi-Access/Mobile Edge Computing ("MEC") devices, referred to sometimes herein simply as "MECs" 1107. For example, DU 1103-1 may be communicatively coupled to MEC 1107-1, DU 1103-N may be communicatively coupled to MEC 1107-N, CU 1105 may be communicatively coupled to MEC 1107-2, and so on. MECs 1107 may include hardware resources (e.g., configurable or provisionable hardware resources) that may be configured to provide services and/or otherwise process traffic to and/or from UE 1001, via a respective RU 1101.

For example, DU 1103-1 may route some traffic, from UE 1001, to MEC 1107-1 instead of to a core network via CU 1105. MEC 1107-1 may process the traffic, perform one or more computations based on the received traffic, and may provide traffic to UE 1001 via RU 1101-1. In some embodiments, MEC 1107 may include, and/or may implement, some or all of the functionality described above with respect to DMAS 101, messaging system 103, AF 1030, UPF 1035, and/or one or more other devices, systems, VNFs, CNFs, etc. In this manner, ultra-low latency services may be provided to UE 1001, as traffic does not need to traverse DU 1103, CU 1105, links between DU 1103 and CU 1105, and an intervening backhaul network between RAN environment 1100 and the core network.

Figure 12:
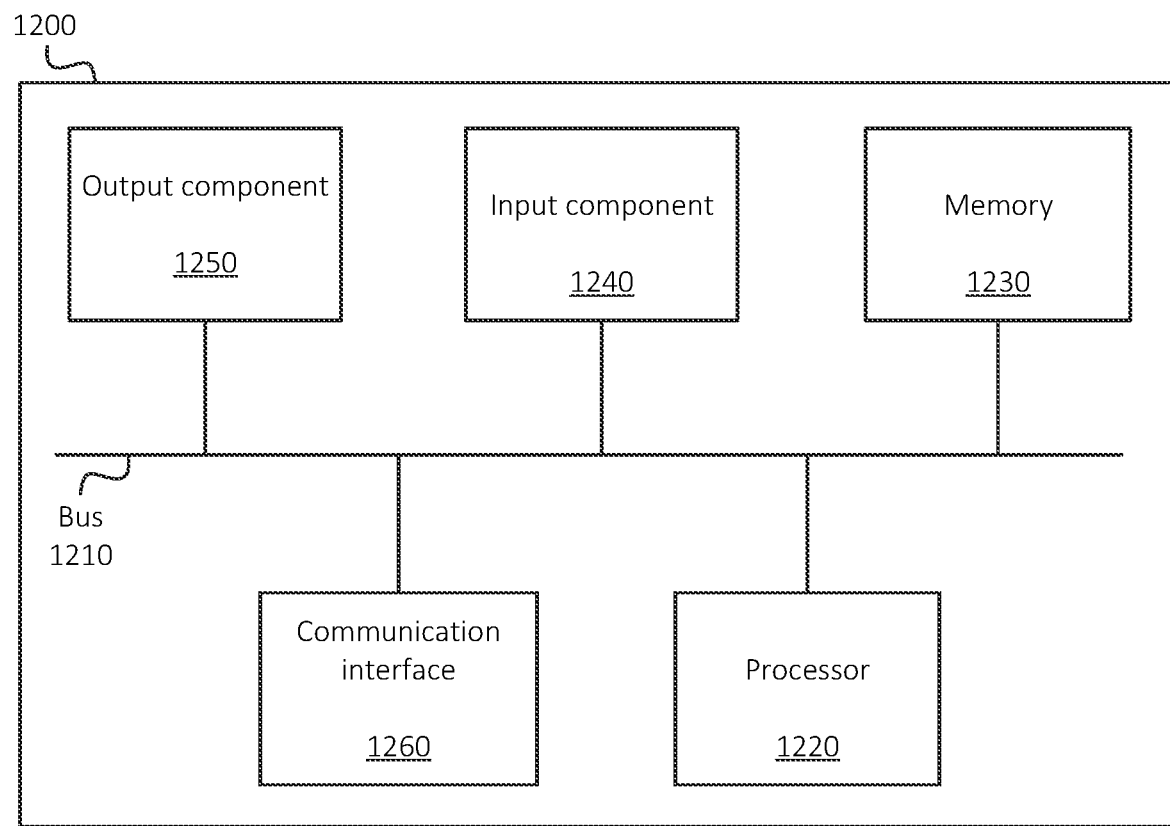
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to input component 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a first message that includes a first set of sender attributes and first message content; identify, based on the first set of sender attributes, that the first message associated with an internal source; forward the first message, without modifying the first message content, based on identifying that the first message is associated with an internal source; receive a second message that includes a second set of sender attributes and second message content; identify, based on the second set of sender attributes, that the second message is associated with an external source; selectively process the second message based on identifying that the second message is associated with an external source, wherein selectively processing the second message includes: determining whether the second message includes valid authentication credentials; when determining that the second message does not include valid authentication credentials: generating third message content by modifying the second message content, wherein modifying the second message content includes replacing a first font specified in the second message content with a second font and adding an indication that the second message is associated with the external source, and forwarding the second message with the third message content in lieu of the second message content; and when determining that the second message includes valid authentication credentials, forwarding the second message with the second message content without modifying the second message content, wherein forwarding the second message without modifying the second message content includes forwarding the second message without the indication that the second message is associated with the external source; receive, after selectively processing the second message, a third message that includes a same set of authentication credentials as included in the second message; and determine that the set of authentication credentials included in the third message are not valid based on the same set of authentication credentials having been included in the previously received second message.

2. The device of claim 1, wherein the second set of sender attributes include a domain associated with a sender of the second message, wherein identifying that the second message is associated with an external source includes:
identifying that the domain associated with the sender does not match a domain associated with a recipient of the second message,
wherein selectively processing the second message, including determining whether the second message includes valid authentication credentials, is performed based on identifying that the domain associated with the sender does not match the domain associated with the recipient of the second message.

3. The device of claim 1, wherein the second message content includes a subject line, wherein modifying the second message content includes adding one or more characters to the subject line.

4. The device of claim 1, wherein the one or more processors are further configured to:
identify that a domain associated with a sender of the first message matches a domain associated with a recipient of the first message,
wherein forwarding the first message, without modifying the first message content, is performed based on identifying that the domain associated with the sender of the first message matches the domain associated with the recipient of the first message.

5. The device of claim 1, wherein modifying the second message content includes:
identifying one or more hyperlinks included in the second message; and
removing the one or more hyperlinks from the second message, wherein the third message content does not include the removed one or more hyperlinks.

6. The device of claim 1, wherein the device is a first device,
wherein when the second message is forwarded with the second message content, a second device receiving the second message presents a graphical user interface ("GUI") that includes the second message content with the first font, and
wherein when the second message is forwarded with the third message content, the second device presents a GUI that includes the third message content with the second font.

7. The device of claim 1, wherein the authentication credentials included in the third message are based on one or more cryptographic keys.

8. A non-transitory computer-readable medium, storing a plurality of processor-executable instructions to: receive a first message that includes a first set of sender attributes and first message content; identify, based on the first set of sender attributes, that the first message associated with an internal source; forward the first message, without modifying the first message content, based on identifying that the first message is associated with an internal source; receive a second message that includes a second set of sender attributes and second message content; identify, based on the second set of sender attributes, that the second message is associated with an external source; and selectively processing the second message based on identifying that the second message is associated with an external source, wherein selectively processing the second message includes: determining whether the second message includes valid authentication credentials; when determining that the second message does not include valid authentication credentials; generating third message content by modifying the second message content, wherein modifying the second message content includes replacing a first font specified in the second message content with a second font and adding an indication that the second message is associated with the external source, and forwarding the second message with the third message content in lieu of the second message content; and when determining that the second message includes valid authentication credentials, forwarding the second message with the second message content without modifying the second message content, wherein forwarding the second message without modifying the second message content includes forwarding the second message without the indication that the second message is associated with the external source; receive, after selectively processing the second message, a third message that includes a same set of authentication credentials as included in the second message; and determine that the set of authentication credentials included in the third message are not valid based on the same set of authentication credentials having been included in the previously received second message.

9. The non-transitory computer-readable medium of claim 8, wherein the second set of sender attributes include a domain associated with a sender of the second message, wherein identifying that the second message is associated with an external source includes:
identifying that the domain associated with the sender does not match a domain associated with a recipient of the second message,
wherein selectively processing the second message, including determining whether the second message includes valid authentication credentials, is performed based on identifying that the domain associated with the sender does not match the domain associated with the recipient of the second message.

10. The non-transitory computer-readable medium of claim 8, wherein the second message content includes a subject line, wherein modifying the second message content includes adding one or more characters to the subject line.

11. The non-transitory computer-readable medium of claim 8, wherein the plurality of processor-executable instructions further include processor-executable instructions to:
identify that a domain associated with a sender of the first message matches a domain associated with a recipient of the first message,
wherein forwarding the first message, without modifying the first message content, is performed based on identifying that the domain associated with the sender of the first message matches the domain associated with the recipient of the first message.

12. The non-transitory computer-readable medium of claim 8, wherein modifying the second message content includes:
identifying one or more hyperlinks included in the second message; and
removing the one or more hyperlinks from the second message, wherein the third message content does not include the removed one or more hyperlinks.

13. The non-transitory computer-readable medium of claim 8, wherein the authentication credentials included in the third message are based on one or more cryptographic keys.

14. A method, comprising: receiving a first message that includes a first set of sender attributes and first message content; identifying, based on the first set of sender attributes, that the first message associated with an internal source; forwarding the first message, without modifying the first message content, based on identifying that the first message is associated with an internal source; receiving a second message that includes a second set of sender attributes and second message content; identify, based on the second set of sender attributes, that the second message is associated with an external source; and selectively processing the second message based on identifying that the second message is associated with an external source, wherein selectively processing the second message includes: determining whether the second message includes valid authentication credentials; when determining that the second message does not include valid authentication credentials; generating third message content by modifying the second message content, wherein modifying the second message content includes replacing a first font specified in the second message content with a second font and adding an indication that the second message is associated with the external source, and forwarding the second message with the third message content in lieu of the second message content; and when determining that the second message includes valid authentication credentials, forwarding the second message with the second message content without modifying the second message content, wherein forwarding the second message without modifying the second message content includes forwarding the second message without the indication that the second message is associated with the external source; receive, after selectively processing the second message, a third message that includes a same set of authentication credentials as included in the second message; and determine that the set of authentication credentials included in the third message are not valid based on the same set of authentication credentials having been included in the previously received second message.

15. The method of claim 14, wherein the second set of sender attributes include a domain associated with a sender of the second message, wherein identifying that the second message is associated with an external source includes:
identifying that the domain associated with the sender does not match a domain associated with a recipient of the second message,
wherein selectively processing the second message, including determining whether the second message includes valid authentication credentials, is performed based on identifying that the domain associated with the sender does not match the domain associated with the recipient of the second message.

16. The method of claim 14, wherein the second message content includes a subject line, wherein modifying the second message content includes adding one or more characters to the subject line.

17. The method of claim 14, further comprising:
identifying that a domain associated with a sender of the first message matches a domain associated with a recipient of the first message,
wherein forwarding the first message, without modifying the first message content, is performed based on identifying that the domain associated with the sender of the first message matches the domain associated with the recipient of the first message.

18. The method of claim 14, wherein modifying the second message content includes:
identifying one or more hyperlinks included in the second message; and
removing the one or more hyperlinks from the second message, wherein the third message content does not include the removed one or more hyperlinks.

19. The method of claim 14,
wherein when the second message is forwarded with the second message content, a device receiving the second message presents a graphical user interface ("GUI") that includes the second message content with the first font, and
wherein when the second message is forwarded with the third message content, the device presents a GUI that includes the third message content with the second font.

20. The method of claim 14, wherein the authentication credentials included in the third message are based on one or more cryptographic keys.

* * * * *